(12) United States Patent
Fukushi et al.

(10) Patent No.: US 6,909,568 B2
(45) Date of Patent: Jun. 21, 2005

(54) SERVO DATA WRITING DEVICE

(75) Inventors: Masanori Fukushi, Kawasaki (JP); Masaru Ishijima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/740,286

(22) Filed: Dec. 18, 2003

(65) Prior Publication Data

US 2004/0130817 A1 Jul. 8, 2004

Related U.S. Application Data (62) Division of application No. 09/357,683, filed on Jul. 20, 1999, now abandoned.

(30) Foreign Application Priority Data

Nov. 30, 1998 (JP) ............................................ 10-339597

(51) Int. Cl.⁷ .............................. G11B 5/09; G11B 21/02
(52) U.S. Cl. ............................................ 360/51; 360/75
(58) Field of Search ........................ 360/75, 51, 77.08, 360/78.04, 77.02

(56) References Cited

U.S. PATENT DOCUMENTS

| | | | |
|---|---|---|---|
| 5,012,363 A | 4/1991 | Mine et al. ............... | 360/77.05 |
| 5,315,372 A | 5/1994 | Tsai ........................... | 356/358 |
| 5,465,182 A | 11/1995 | Ishikawa ..................... | 360/75 |
| 5,535,067 A * | 7/1996 | Rooke ......................... | 360/51 |
| 5,771,130 A | 6/1998 | Baker ........................... | 360/75 |
| 5,796,541 A * | 8/1998 | Stein et al. ................... | 360/75 |
| 5,909,333 A | 6/1999 | Best et al. .................... | 360/51 |
| 6,009,063 A | 12/1999 | Nguyen et al. ............. | 369/109 |
| 6,084,738 A * | 7/2000 | Duffy ........................... | 360/75 |
| 2002/0012293 A1 | 1/2002 | Tsai ............................ | 369/13 |

FOREIGN PATENT DOCUMENTS

JP  5-36223  2/1993

* cited by examiner

*Primary Examiner*—Andrew L. Sniezek
(74) *Attorney, Agent, or Firm*—Greer, Burns & Crain, Ltd.

(57) ABSTRACT

A servo writing device which writes servo data in each sector of each track of a magnetic disk, wherein servo data recorded positions of the tracks are mutually corresponded. The servo writing device includes a clock head for generating reference clock signals and a standard clock generating circuit generating standard clock signals, whose frequency is higher than that of the reference clock signals and which is not synchronized with the reference clock signals. The device further includes a start pulse generating circuit receiving the reference clock signals as clock signals and generating a start pulse corresponding to the servo data recorded position and a synchronizing circuit synchronizing the start pulse with the standard clock signals and generating a synchronizing-start pulse. In addition, the device also includes a pattern generating circuit receiving the standard clock signals as clock signals and generating the servo data synchronizing with the synchronizing-start pulse.

1 Claim, 6 Drawing Sheets

SERVO DATA WRITING DEVICE

This is a divisional of application Ser. No. 09/357,683, filed Jul. 20, 1999 now abandoned.

BACKGROUND OF THE INVENTION

The present invention relates to a servo data writing device which writes servo data for positioning a magnetic head for writing and reading data on a magnetic disk of a magnetic disk drive unit.

Magnetic disks are assembled in a magnetic disk drive unit. A plurality of tracks are coaxially formed in each magnetic disk. Servo data are magnetically written in each sector of each track. The servo data are used to position magnetic heads in object tracks.

When the servo data are written in the magnetic disk, no servo data have been written in the magnetic disk, so the magnetic disk drive unit cannot position its own magnetic head.

For example, the magnet disk drive unit is assembled by the steps of: assembling a motor for rotating a spindle; attaching magnetic disks to the spindle; assembling an inner actuator, which has arms for holding the magnetic heads and moves the magnetic heads in the radial direction of the magnetic disks; and attaching the magnetic heads to the arms. The magnetic disk drive unit, whose arms, magnetic disks and magnetic heads are accessible from outside, is attached to a servo data writing device so as to write the servo data. Note that, the state of "accessible from outside" means that a state in which the magnetic disk drive unit is not accommodated in a chassis, a state in which the magnetic disk drive unit is accommodated in the chassis piece but element members therein can be accessible from outside, etc.

Figure 6:
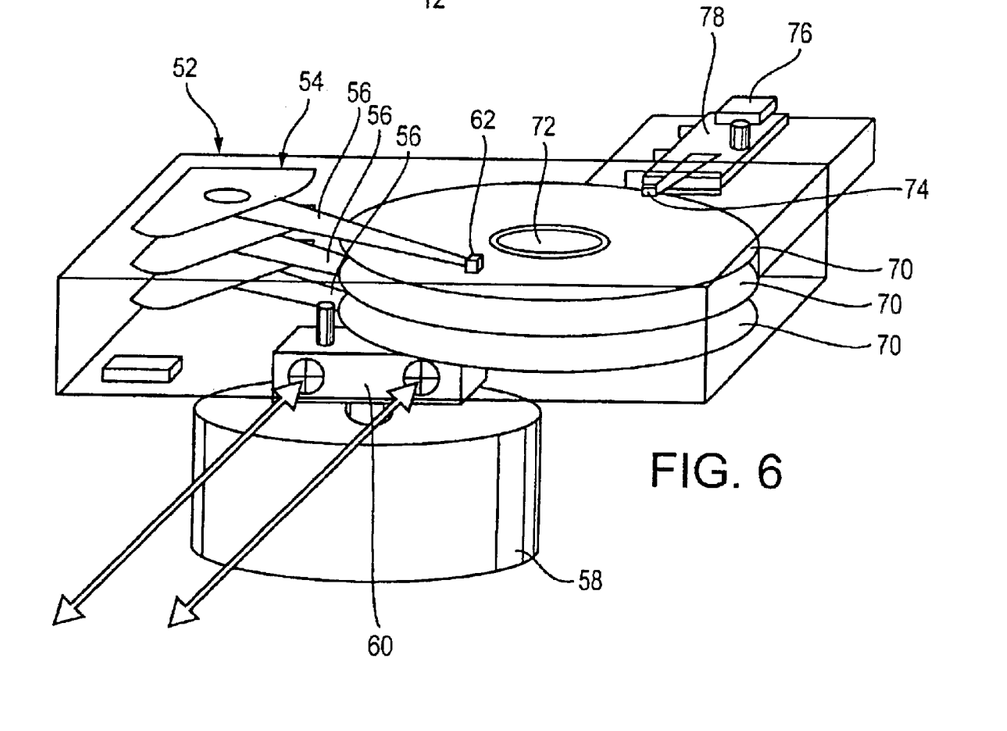
FIG. 6 is an explanation view showing a brief structure of the conventional servo data writing device.
Figure 7:
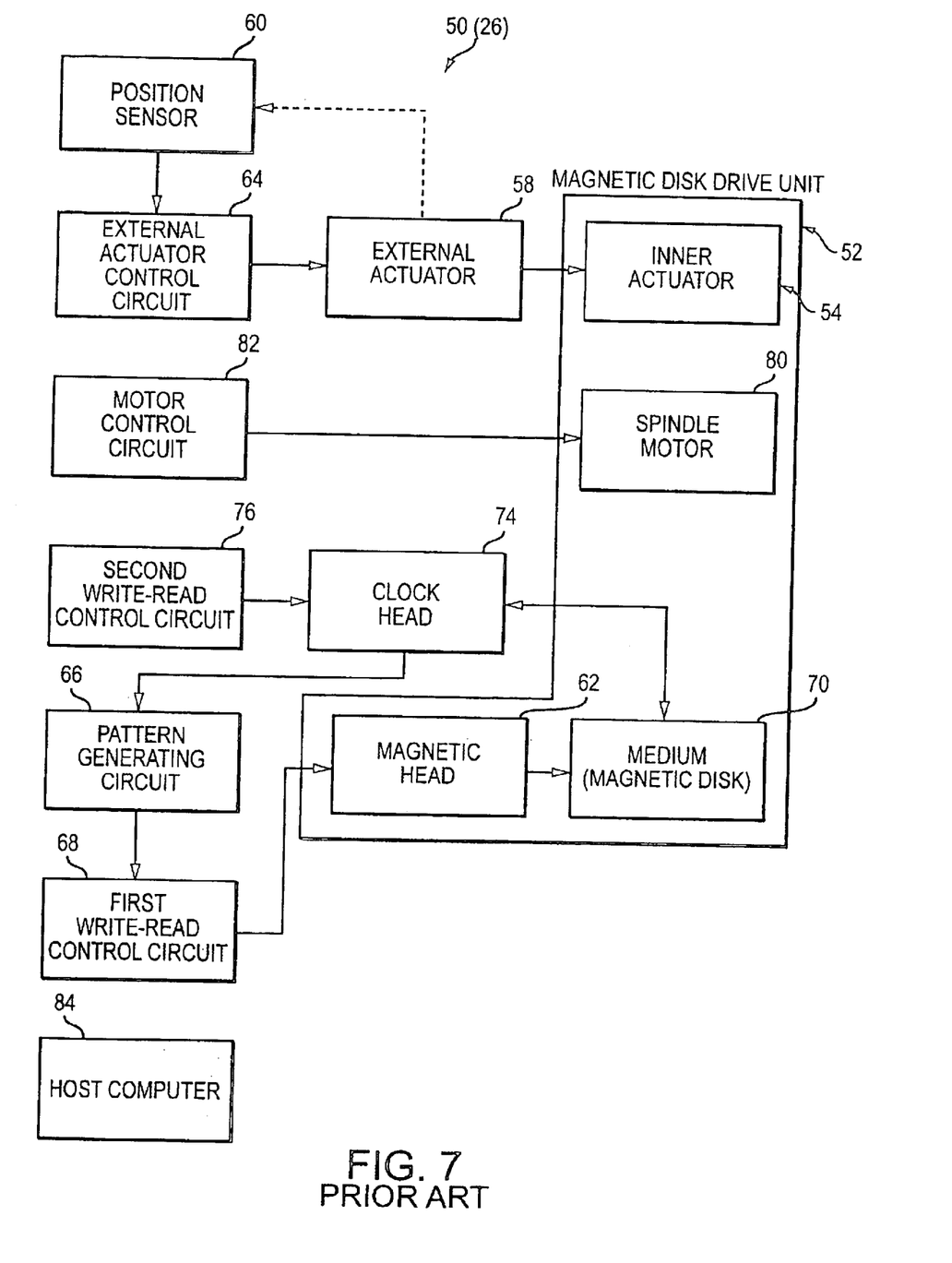
FIG. 7 is a block diagram of the conventional servo data writing device shown in FIG. 6.

For example, as shown in FIGS. 6 and 7, a conventional servo data writing device includes: an external actuator 58 capable of positioning arms 56 of an inner actuator 54 of a magnetic disk drive unit 52 from outside; a position sensor 60 for detecting a present position of the external actuator 58; an external actuator control circuit 64 capable of positioning the external actuator 58 with the position sensor 60 and positioning magnetic heads 62, which is held by the arms 56, in prescribed tracks; a pattern generating circuit 66 for generating the servo data, which are written in a predetermined position in each sector of each track; a first write-read control circuit 68 capable of writing the servo data in magnetic disks 70 with the magnetic heads 62, which is provided in the magnetic disk drive unit 52; a clock head 74 capable of recording reference clock signals, which are synchronized with rotation of a spindle 72 and the magnetic disks 70, in clock recording areas, which are, for example, respectively provided in outer edges of the magnetic disks 70, and reproducing the reference clock signals; a second write-read control circuit 76; a driving mechanism 78 of the clock head 74; a spindle motor 80 for rotating the spindle 72; and a motor control circuit 82 capable of rotating the spindle 72 at prescribed rotational speed.

A host computer 84, which is provided in the servo data writing device 50, controls structural elements of the servo data writing device 50.

Action of the servo data writing device 50 will be explained. Firstly, the motor control circuit 82 rotates the motor 80 to continuously rotate the magnetic disks 70 at prescribed rotational speed. Next, the reference clock signals are written in the clock recording areas of the magnetic disks 70 with the clock head 74 and the second write-read control circuit 76. The external actuator control circuit 64 positions the external actuator 58 so as to position the magnetic heads, which are held by the arms 56, in object tracks with the position sensor 60. For example, the external actuator 58 positions the arms 56 of the inner actuator 54 by pushing a pin of the external actuator 58. The pin (not shown) of the external actuator 58 is pressed onto the arms 56 of the inner actuator 54 of the magnetic disk drive unit 52 and moved.

When the magnetic heads 62 are positioned in the object track in which the servo data are written, the pattern generating circuit 66 receives the reference clock signals, which are reproduced by the clock head 74, as clock signals and generates the servo data. The servo data are inputted to the magnetic heads 62 via the first write-read control circuit 68, and the servo data are written in the magnetic disks 70.

Note that, frequency of standard clock signals, which are inputted to the pattern generating circuit 66, is generally higher than that of the reference clock signals reproduced by the clock head 74 so as to generate the servo data from the pattern generating circuit 66. Thus, a PLL circuit (not shown) is provided inside or outside of the pattern generating circuit 66. The reference clock signals are inputted to the PLL circuit as clock signals so as to make the standard clock signals for generating the servo data. The frequency of the standard clock signals is integral number times as high as that of the reference clock signals.

The servo data, which are generated from the pattern generating circuit 66, in the sectors must be mutually different even if the sectors are in the same track. The servo data are written at a predetermined position in each sector, and the servo data recorded positions in the sectors must be corresponded. So, the pattern generating circuit 66 generates the start pulse, which is synchronized with the servo data recorded position, on the basis of the reference clock signals, which are changed according to the rotation of the magnetic disks 70, and the servo data for each sector are synchronously generated with the start pulse. The rotational speed of the magnetic disks 70 is controlled at fixed speed, so the start pulses, whose number is equal to number of the sectors in one track, are generated at regular intervals while one magnetic disk 70 makes one rotation.

However, the conventional servo data writing device has following disadvantages.

Firstly, the conventional servo data writing device 50 should have the external actuator 58 and the external actuator control circuit 64, which correspond to the magnetic disk drive unit to be attached, as positioning means. And, the clock head 74, the second write-read control circuit 76, the driving mechanism 78 and the first write-read control circuit 68 should be required so as to write the servo data in the magnetic disks and to read the same therefrom.

Therefore, the system of the servo data writing device 50 must be huge and the body of the device 50 must be large and heavy. These days, the technology of the magnetic disk has been highly advanced, and the magnetic disk drive units are frequently improved. Hardware of the servo data writing device having huge system must be frequently changed when the type of the magnetic disk drive unit is changed, so that manufacturing cost must be higher, and extra work takes time uneconomically.

Secondly, in the conventional servo data writing device, the servo data are recorded at the predetermined position of each sector of each track, and the the servo data recorded positions in the sectors are mutually corresponded, as described above. Thus, in the conventional device 50, firstly the reference clock signals are written in the clock recording areas of the magnetic disks 70 with the clock head 74.

When the servo data are written in the tracks, the reference clock signals are reproduced by the clock head 74, the start pulse synchronized with the reference clock signals is generated on the basis of the reference clock signals, and the servo data of each sector is synchronously generated with the start pulse. Further, the standard clock signals, whose frequency is higher than that of the reference clock signals, are generated on the basis of the reference clock signals, and the servo data are generated from the pattern generating circuit 66 on the basis of the standard clock signals.

In the mean time, the PLL circuit receives the reference clock signals and generates the standard clock signals having higher frequency. Therefore, duty ratio of the reference clock signals should be fixed. If the duty ratio is not fixed, the PLL circuit does not correctly work and the standard clock signals are stopped. When a record starting point of the reference clock signals and a record terminating point thereof are not smoothly connected by the clock head, the duty ratio is not fixed. Conventionally, the action of writing the reference clock signals must be repeated many times until the points are smoothly connected.

SUMMARY OF THE INVENTION

The present invention has been studied to solve the above described disadvantages of the conventional devices.

The inner actuator control circuit, the circuit for controlling the motor for rotating the spindle and the first write-read control circuit of the magnetic head are finally assembled in the magnetic disk drive unit. So, an object of the present invention is to provide a small servo data writing device, which is capable of effectively employing basic function of the magnetic disk drive unit and making the system structure simpler.

Another object is to provide a servo data writing device, which is capable of correctly writing the servo data even if the record starting and terminating points of the reference clock signals are not smoothly connected and the duty ratio is not partially fixed.

To achieve the objects, a first basic structure of the present invention is a servo data writing device, to which a magnetic disk drive unit, which includes: a magnetic disk attached to a spindle; a magnetic head for writing data onto and reading data from the magnetic disk; and an inner actuator for moving an arm holding the magnetic head in the radial direction of the magnetic disk, is attached and which writes servo data in each track of the magnetic disk with the magnetic head, comprising a non-contact position sensor for detecting a position of the arm from outside of the magnetic disk drive unit without contact, wherein the servo data writing device detects the position of the arm by the non-contact position sensor and controls an inner actuator control circuit, which is assembled in the magnetic disk driveunit, so as to position the magnetic head.

A second basic structure of the present invention is a servo data writing device, to which a magnetic disk drive unit, which includes: a magnetic disk attached to a spindle; a magnetic head for writing data onto and reading data from the magnetic disk; and an inner actuator for moving an arm holding the magnetic head in the radial direction of the magnetic disk, is attached and which writes servo data in each track of the magnetic disk with the magnetic head, comprising a clock head for detecting rotation of the spindle or the magnetic disk from outside of the magnetic disk drive unit without contact and generating reference clock signals, which are changed on the basis of the rotation of the spindle or the magnetic disk, wherein the servo data writing device generates the servo data on the basis of the reference clock signals as clock signals, and wherein the servo data writing device actuates a write-read control circuit of the magnetic head so as to write the servo data generated on the magnetic disk with the magnetic head.

In the second basic structure, the device may further comprise a non-contact position sensor for detecting a position of the arm from outside of the magnetic disk drive unit without contact, and the servo data writing device may detect the position of the arm by the non-contact position sensor and control an inner actuator control circuit, which is assembled in the magnetic disk drive unit, so as to position the magnetic head.

With above described structures, the function of controlling the inner actuator, the function of writing data on and reading data from the magnetic disk and the function of controlling the spindle motor, which are basic functions of the magnetic disk drive unit which is nearly completely assembled, can be used by the servo data writing device, so that the system structure of the servo data writing device can be simpler and smaller.

The reference clock signals need not be written, so required time for writing the servo data can be shorter.

The non-contact sensors for detecting the present position of the arm and detecting the rotation of the spindle or the magnetic disk are provided to the servo data writing device. Therefore, the magnetic disk drive unit can be accommodated in a chassis, which has an air-tightly sealed window or windows for the non-contact sensors, so that the completely assembled magnetic disk drive unit can be attached in the servo data writing device and the servo data can be written in the magnetic disk. Conventionally, the step of writing the servo data must be executed in a clean room, but the step can be executed in other places by employing the servo data writing device of the present invention facility investment and cost of manufacturing the magnetic disk drive units can be sharply reduced.

Note that, in the case that the servo data writing device uses the basic functions of the magnetic disk drive unit, control signals may be transmitted to the magnetic disk drive unit via an interface, which is provided to the magnetic disk drive unit, and data from the inner members of the magnetic disk drive unit may be received via the interface.

A third basic structure of the present invention is a servo data writing device, to which a magnetic disk drive unit, which includes: a magnetic disk attached to a spindle; and a magnetic head for writing data onto and reading data from the magnetic disk, is attached and which writes servo data in each sector of each track of the magnetic disk with the magnetic head wherein servo data recorded positions of the tracks are mutually corresponded, comprising: a clock head for generating reference clock signals, which are changed on the basis of rotation of the spindle or the magnetic disk; a standard clock generating circuit generating standard clock signals, whose frequency is higher than that of the reference clock signals and which is not synchronized with the reference clock signals; a start pulse generating circuit receiving the reference clock signals as clock signals and generating a start pulse corresponding to the servo data recorded position; a synchronizing circuit synchronizing the start pulse with the standard clock signals and generating a synchronizing-start pulse; and a pattern generating circuit receiving the standard clock signals as clock signals and generating the servo data synchronizing with the synchronizing-start pulse.

With this basic structure, even if the record starting point and terminating point of the reference clock signals, which are written by the clock head, are not smoothly connected and the duty ratio of the reference clock signals is not partially fixed, the servo data can be correctly written in the magnetic disk because the pattern generating circuit, which generates the servo data, does not use the reference clock signals and signals, which are generated by a PLL circuit and whose frequency is integral number times as high as that of the reference clock signals, as clock signals. The reference clock signals are used to generate the start pulse for outputting the servo data, and the start pulse is synchronized with high frequency clock signals, which are inputted to the pattern generating circuit as clock signals, other than the reference clock signals, so that the servo data recorded positions in each track can be corresponded without shifting.

BRIEF DESCRIPTION OF THE DRAWINGS

Embodiments of the present invention will now be described by way of examples and with reference to the accompanying drawings, in which.

DETAILED DESCRIPTION OF THE PREFERRED EMBODIMENTS

Preferred embodiments of the present invention will now be described in detail with reference to the accompanying drawings.

First Embodiment

Firstly, the servo data writing device, which has simple inner structure and which effectively uses basic functions of a magnetic disk drive unit, will be explained. Note that, elements described in "BACKGROUND OF THE INVENTION" are assigned the same symbols and detail explanation will be omitted.

The servo data writing device 10 of the present embodiment will be explained with reference to FIG. 1.

The servo data writing device 10 comprises: a non-contact position sensor 12 for detecting present positions of arms 56 of an inner actuator 54, which is assembled in a magnetic disk drive unit 52, without contact; a clock head 13 detecting rotation of a spindle 72 or a magnetic disk 70, which is assembled in the magnetic disk drive unit 52, and generating reference clock signals, which are changed on the basis of the rotation of the spindle 72 or the magnetic disk 70; and a host computer 84 capable of controlling the whole servo data writing device 10 and the magnetic disk drive unit 52, which is attached to the servo data writing device 10.

Next, the structure of the magnetic disk drive unit 52 will be explained. Unlike the magnetic disk drive units which are written by the conventional servo data writing device, the inner members, e.g., control circuits, the magnetic disks 70, the inner actuator 54, are assembled in a chassis 14. Namely, the magnetic disk drive unit 52 to be attached to the device 10 has been completely assembled as shown in FIGS. 1 and 2.

The inner members of the magnetic disk drive unit 52 are: the inner actuator 54 having the arms 56 which hold magnetic heads 62; an inner actuator control circuit 16 for controlling the inner actuator 54; the magnetic disks (media) 70 attached to the spindle 72; a spindle motor 80 for rotating the spindle 72; a motor control circuit 82 for controlling rotation of the motor 80; a write-read control circuit 68 for controlling the magnetic heads 62, which corresponds to the first write-read control circuit described in "BACKGROUND OF THE INVENTION", so as to write and read data; a system controller 18 for totally controlling the unit 52; and a pattern generating circuit 66 for generating the servo data. They are previously assembled in the unit 52.

The system controller 18 is electrically connected with the host computer 84, which is provided in the servo data writing device 10, via an external interface 23. And, the system controller 18 controls the inner members of the magnetic disk drive unit 52 and manages servo data writing action on the basis of commands from the host computer 84.

To detect the present position of the arms 56 by the non-contact position sensor 12 which is provided to the servo data writing device 10, a fan-shaped encoding scale 20, for example, is provided to the arm 56. The non-contact position sensor 12 is electrically connected with the inner actuator control circuit 16 via the external interface 23.

The clock head 13 of the servo data writing device 10 detects the rotation of the spindle 72 or the magnetic disks 70 and generates the reference clock signals, which are changed on the basis of the rotation thereof, so a circular encoding scale 22 is attached to the spindle 72 or the magnetic disks 70. The clock head 13 is electrically connected with the pattern generating circuit 66, which generates the patterns of the servo data, via an external interface 23.

In the case that the pattern generating circuit 66 cannot be accommodated in the magnetic disk drive unit 52, the pattern generating circuit 66 may be provided in the servo data writing device 10.

The non-contact (optical) position sensor 12 and the non-contact (optical) clock head 13 of the servo data writing device 10 must be capable of sensing the encoding scales 20 and 22, which are provided in the magnetic disk drive unit 52, from outside, so a check window 24, which is made of a transparent material, e.g., glass, plastic, and which is air-tightly sealed, is formed in the chassis 14 of the magnetic disk drive unit 52 as shown in FIG. 2.

Besides the encoding scale 22 attached to the spindle 72, an encodng pattern 34, for example, may be opti-magnetically formed on the magnetic disk 70, which is located at a front end so as to generate the reference clock signals. The encoding pattern can be detected by a non-contact means, e.g., an optical pick-up.

Further, the reference clock signals may be generated by detecting the rotation of the magnetic disks 70 with Laser-Doppler means provided to the clock head 13. In this case, the reference clock signals are generated on the basis of change of frequency between radiated laser, which is radiated from the Laser-Doppler means toward a surface of the magnetic disk 70, and reflected laser, which is reflected on the surface thereof. Therefore, no encoding means is provided to the spindle 72 or the magnetic disk 70.

Figure 3:
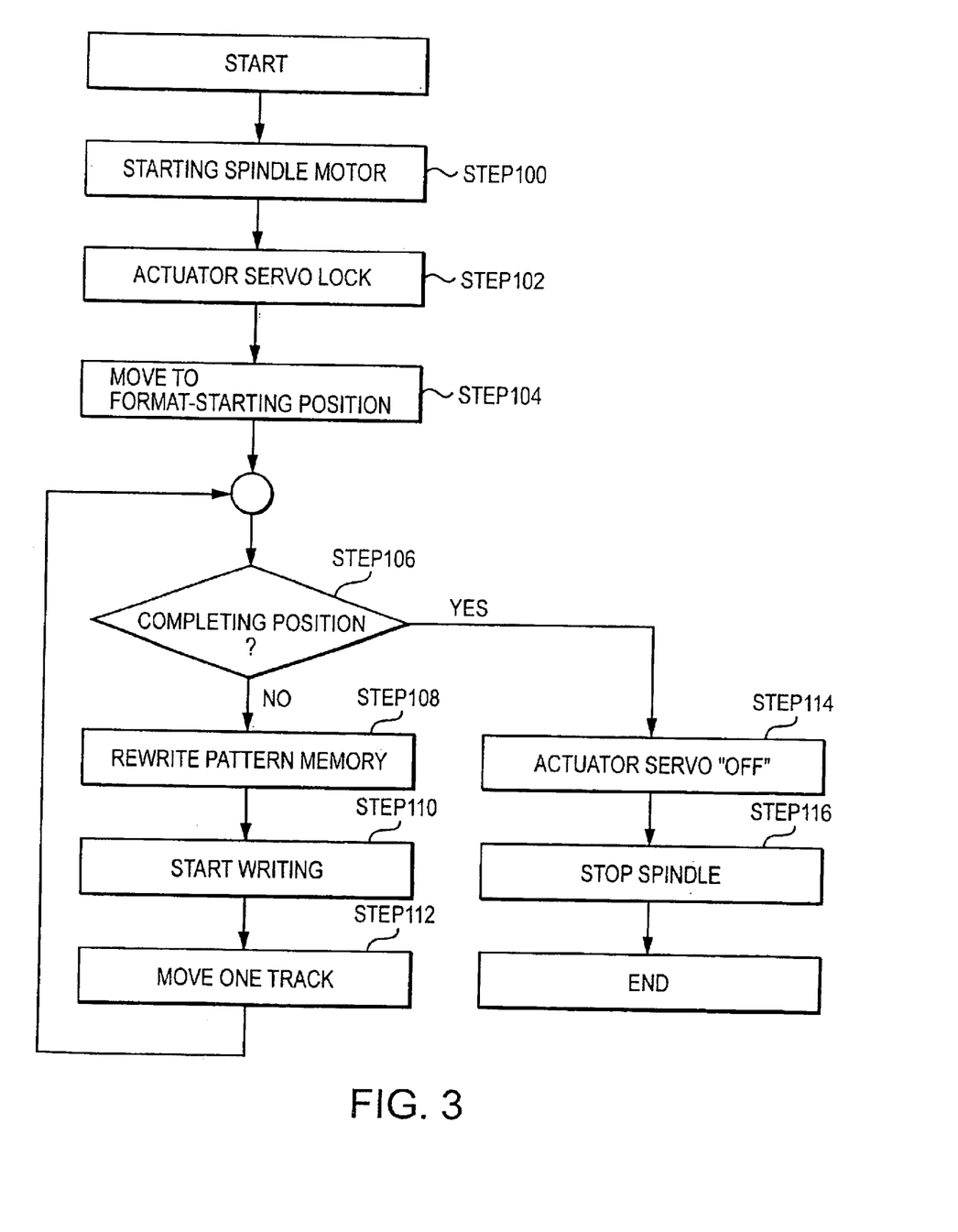
FIG. 3 is a flow chart of data writing action of the servo data writing device shown in FIG. 1.

Successively, action of the servo data writing device 10 will be explained with reference to FIG. 3.

Firstly, the host computer 84 instructs the system controller 18 to start the spindle motor 80. The system controller 18 rotates the motor 80 by the motor control circuit 82 so as to rotate the spindle 72 and the magnetic disks 70 at predetermined speed (STEP 100).

Next, the host computer 84 instructs servo-lock of the inner actuator 54 to the system controller 18. Then, the system controller 18 sends an instruction of the servo-lock to the inner actuator control circuit 16. The inner actuator control circuit 16 detects the present positions of the arms 56 of the inner actuator 54 by the non-contact position sensor 12. In a servo-lock state, the inner actuator control circuit 16 allows the arms 56 to automatically move the magnetic heads 62 toward object positions when the object positions of the magnetic head 62 are sent from the system controller 18 (STEP 102).

Next, the host computer 84 inputs a format-starting position, from which the servo data are started to be written, to the system controller 18. Further, a format-starting track position and a format-terminating trac position are also sent from the host computer 84.

The system controller 18 automatically determines the object (track) positions of the magnetic heads 62, with predetermined pitches, from the format-starting track position as a standard position. And, the system controller 18 sends the determined object positions to the inner actuator control circuit 16.

The system controller 18 sends the format-starting track position, which has been sent from the host computer 84, to the inner actuator control circuit 16 as a first track position. Then, the inner actuator control circuit 16 controls the inner actuator 54 with detecting the present positions of the arms 56 by the non-contact position sensor 12 so as to move the magnetic heads 62 to the object positions (STEP 104).

The system controller 18 checks if the object positions of the magnetic heads 62, which have been sent from the system controller 18 to the inner actuator control circuit 16, are format-terminating track positions or not (STEP 106).

If the object positions are not the format-terminating positions, the servo data for one track, which are sent from the pattern generating circuit 66, are rewritten on the basis of the object track position (STEP 108).

Upon completing rewriting the servo data, the servo data for each sector of the object track, in which the magnetic heads 62 exist, are written sector by sector (STEP 110). Groups of the servo data, whose number is equal to numbr of the sectors in the track, are generated, from the pattern generating circuit 66, at regular intervals while one magnetic disk 70 makes one rotation as well as the conventional device. The servo data generated are sent to the magnetic head 62 via the write-record control circuit 68 and written on the track.

Upon completing writing the servo data in the object tracks with the magnetic heads 62, the system controller 18 determines the next object positions of the magnetic heads 62 and sends them to the inner actuator control circuit 16. With this action, the magnetic heads 62 are moved to the next tracks (STEP 112).

The system controller 18 repeats the STEPs 106–112 with checking if the object positions of the magnetic heads 62, which have been sent from the system controller 18 to the inner actuator control circuit 16, are the format-terminating track positions or not in the STEP 106. With this action, the assigned servo data can be written in each sector of each track.

In the STEP 106, if the object positions of the magnetic heads 62 reach the format-terminating track position, the servo-lock action by the inner actuator control circuit 16 is stopped (STEP 114).

And, the motor control circuit 82 stops the motor 80 to stop the spindle 72 and the magnetic disks 70 (STEP 116).

In the STEP 116, the action of writing the servo data in the magnetic disks 70 is completed.

The magnetic disk drive unit 52, whose servo data are written by the servo data writing device 10, has been nearly completely assembled. Namely, the control circuits, etc. have been already assembled in the chassis 14. And, the servo data writing device 10 uses the basic functions of the magnetic disk drive unit 52, e.g., function of controlling the inner actuator, function of writing data onto and reading data from the magnetic disk, function of controlling the spindle motor, when the servo data are written; the structure of the servo data writing device 10 can be simpler than that of the conventional servo data writing device. Therefore, the size of the servo data writing device 10 can be smaller.

Unlike the conventional one, the contact-type clock head 74 (see FIG. 6) is not employed to write the reference clock signals onto the magnetic disks 70, so the servo data can be written in a short time.

As described above, the non-contact means are employed to detect the present positions of the arms 56 and the rotation of the spindle 72, etc. and the chassis 14 of the magnetic disk drive unit 52 has the air-tightly sealed window 14, so that the servo data can be written onto the magnetic disks 70 even if the magnetic disk drive unit 52 is air-tightly accommodated in the chassis 14. Therefore, the step of writing the servo data can be executed outside of a clean room.

In the above described embodiment, the servo data writing device 10 uses the basic functions of the magnetic disk drive unit 52, i.e., function of controlling the inner actuator, function of writing data onto and reading data from the magnetic disk, function of controlling the spindle motor. But the servo data writing device 10 may use a part of the functions. Namely, the servo data writing device 10 can use at least a part of the functions of the magnetic disk drive unit 52, so no structural elements for the functions, which are served by the magnetic disk drive unit 52, are provided in the servo data writing device 10 and the structure thereof can be simpler.

For example, the servo data writing device 10 may have no non-contact position, sensor 12. In this case, the clock head 13 is provided to the servo data writing device 10, and the servo data can be written onto the magnetic disks 70 by using the write-read control circuit 68 and the magnetic heads 62, which have been assembled in the magnetic disk drive unit 52.

And, the servo data writing device 10 may have no clock head 13. In this case, the non-contact position sensor 12 is provided to the servo data writing device 10, and the magnetic heads 62 can be positioned by the inner actuator control circuit 16 capable of detecting the positions of the arms 56 and the inner actuator 54, which have been assembled in the magnetic disk drive unit 52.

Further, in the above two cases, the motor control circuit 82 may be assembled in the magnetic disk drive unit 52 and no motor control circuit 82 may be provided in the servo data writing device 10, and vice versa.

In the servo data writing device 10, number of the structural elements is much less than the conventional device, so the size of the servo data writing device 10 can be smaller despite the magnetic disk drive unit 52 can be attached in the servo data writing device 10. Therefore, the magnetic disk drive unit 52 can be attached in the servo data writing device 10 and the servo data can be properly written onto the magnetic disks 70 so as to format them.

Conventionally, control circuits are assembled in the magnetic disk drive unit 52 and a chassis is set after formatting the magnetic disks. Then, the magnetic disk drive unit 52 is connected to a self-test device so as to execute a final function test.

However, in the present embodiment, the magnetic disk drive unit 52 is nearly completely assembled, then the unit 52 is attached to the servo data writing device 10 to write the servo data. The self-test of the magnetic disk drive unit 52 can be execute in the state, in which the unit 52 is attached to the device 10, after the servo data are written. Conventionally, the servo data writing device and the sel-test device must be separately prepared. By employing the present embodiment, the servo data writing work and the self-test can be executed in one device, so that facility cost can be much reduced.

To execute the self-test of the magnetic disk drive unit 52, the servo data writing device 10 down-loads a firmware for the self-test to the magnetic disk drive unit 52 after the servo data are completely written onto the magnetic disks 70.

Second Embodiment

In Second Embodiment, the reference clock signals, which are generated from the clock head, are not directly used by the pattern generating circuit, which generates the servo data, as clock signals, so that the servo data can be correctly written or recorded even if the duty ratio of the reference clock signals is partially fixed. Note that, the elements described in "BACKGROUND OF THE INVENTION" and the First Embodiment are assigned the same symbols and detail explanation will be omitted.

Firstly, the structure of a servo data writing device 26 will be explained. The characteristic point of the present embodiment is the pattern generating circuit 66 and peripheral circuits. The basic structure of the servo data writing device 26 may be the same as that of the First Embodiment (see FIG. 1) or that of the conventional device (see FIG. 7).

In the present embodiment, for example, the servo data writing device 26 has the structure shown in FIG. 7, in which the reference clock signals are written onto the magnetic disk 70 with the clock head 74 at the beginning of the servo data writing action.

The servo data writing device 26 shown in FIG. 7 has a disadvantage: uneven rotation of the motor 80 and the magnetic disks 70. It is very difficult to perfectly connect the record starting point of the reference clock signals with the record terminating point thereof even if the reference clock signals are correctly written, with the clock head 74, on the basis of the rotation of the magnetic disks 70. Namely, the duty ratio of the reference clock signals, which have been reproduced by the clock head 74, is always made uneven at connecting section of the points. If the reference clock signals are used as clock signals of the PLL circuit which generates clock signals of the pattern generating circuit 66, the PLL circuit does not correctly work at the uneven parts, so that the standard clock signals cannot be generated.

Figure 4:
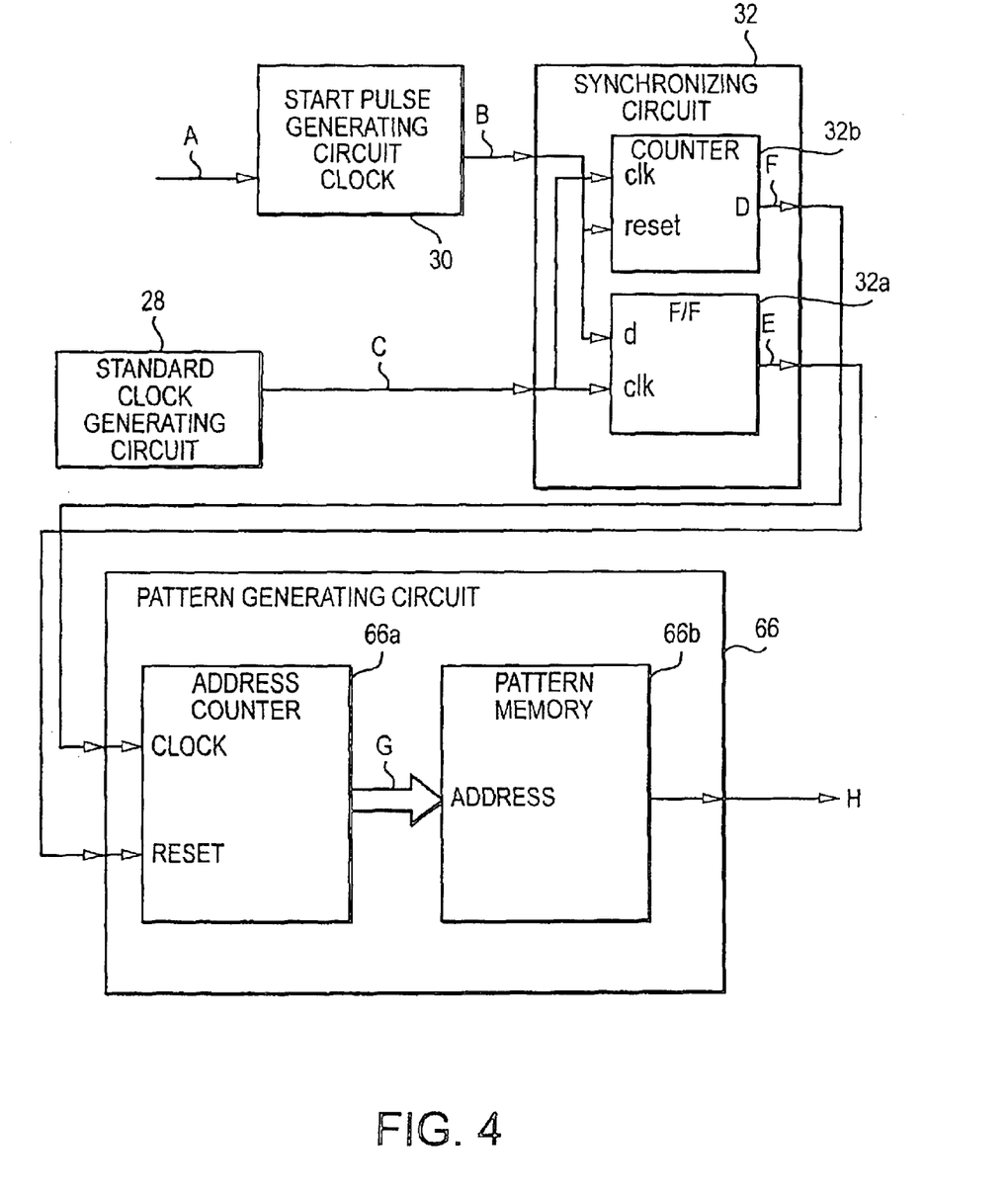
FIG. 4 is an explanation view of a pattern generating circuit and peripheral circuits which are characteristics of Second Embodiment of the servo data writing device of the present invention.

To solve this disadvantage, as shown in FIG. 4, the servo data writing device 26 includes: a standard clock generating circuit 28 generating standard clock signals, whose frequency is higher than that of the reference clock signals reproduced by the clock head 74 and which is not synchronized with the reference clock signals; a start pulse generating circuit 30 receiving the reference clock signals as clock signals and generating a start pulse corresponding to the servo data recorded position; a synchronizing circuit 32 synchronizing the start pulse with the standard clock signals and generating a synchronizing-start pulse; and the pattern generating circuit 66 receiving the standard clock signals as clock signals and generating the servo data synchronizing with the synchronizing-start pulse.

With this structure, the high frequency standard clock signals, which are used as the clock signals for generating the servo data, are not generated by the PLL circuit whose clock signals are the reference clock signals. Even if the connecting point between the record starting point of the reference clock signals and the record terminating point thereof, are slightly shifted by the clock head 74, the servo data can be correctly generated and written. The reference clock signals are used to generate the start pulse for determining timing of outputting the servo data. And, the servo data recorded (written) positions in the tracks can be mutually corresponded because the start pulse is synchronized with the high frequency clock signals, which are used as the clock signals of the pattern generating circuit 66, other than the reference clock signals.

Figure 5:
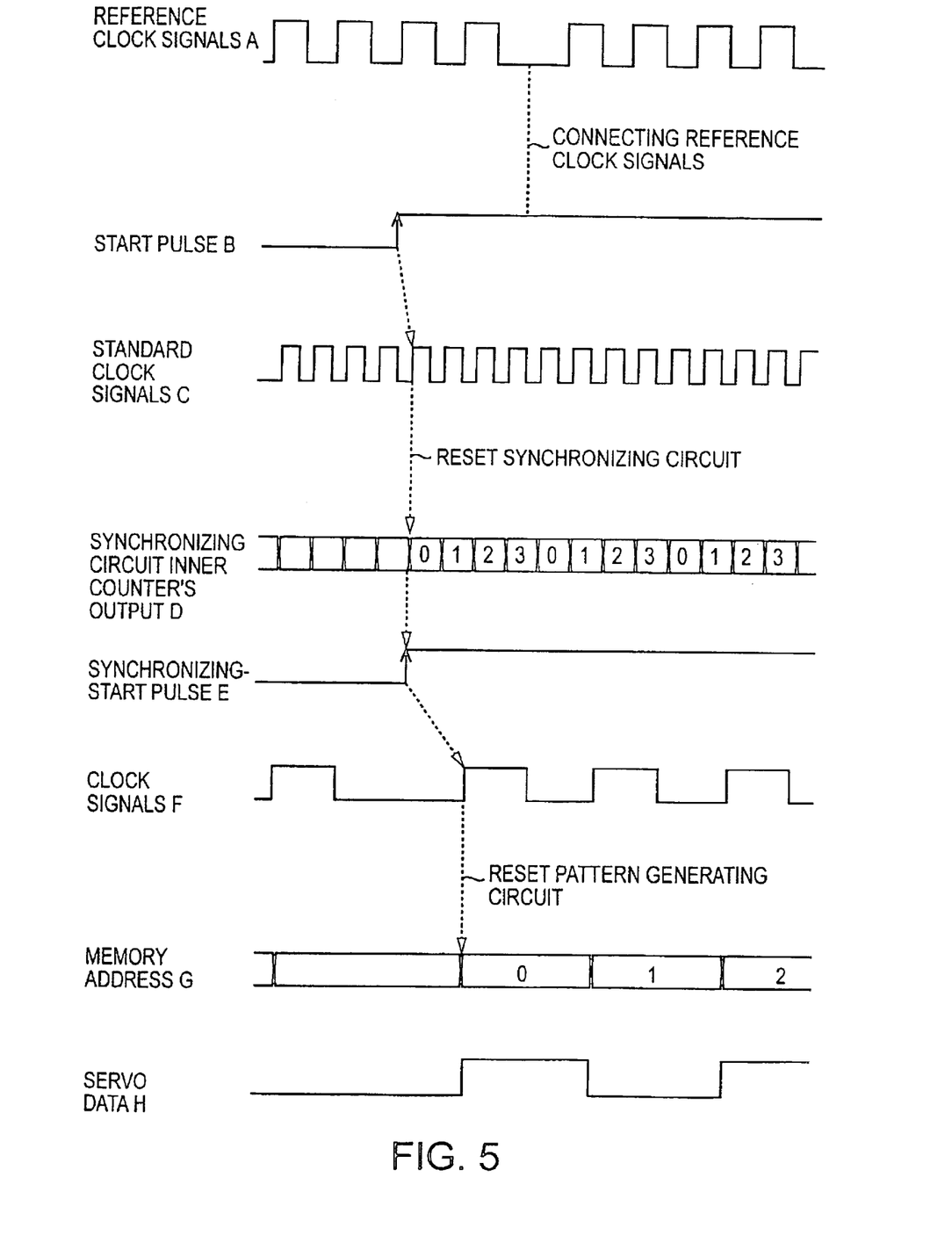
FIG. 5 is a timing chart of the pattern generating circuit and the peripheral circuits shown in FIG. 4.

Concrete servo data generating action will be explained with reference to FIGS. 4 and 5.

The reference clock signals "A", e.g., 5 MHz, are inputted to the start pulse generating circuit 30, and the start pulse generating circuit 30 receives the reference clock signals "A" as the clock signals and generates the start pulse "B" which is synchronized with the servo data recorded position. The start pulse generating circuit 30 is, for example, a dividing circuit. For example, in the case that the rotational speed of the magnetic disks 70 is 100 r.p.m. and number of the sectors in each track is 80, the frequency of the start pulse "B" is 80×100=8 [KHz]. The dividing ratio of the dividing circuit is 5M/100/80=625.

The words "generate the start pulse "B" corresponding to the servo data recorded position" will be explained. The servo data are generated for each sector, and their contents are mutually different. The servo data for each sector must be recorded (written) at the same predetermined position in each sector, so the start pulse "B" is generated so as to start writing the servo data at the predetermined position in each sector.

The start pulse "B" and the standard clock signals "C" (1 GHz) from the standard clock generating circuit 28 are inputted to the synchronizing circuit 32. For example, as shown in FIG. 4, the synchronizing circuit 32 includes a D-flip flop (DFF) 32a and a synchronizing 2-bit counter (first counter) 32b.

The standard clock signals "C" are used as clock signals of the DFF 32a and the first counter 32b. The start pulse. "B" is use by the first counter 32b as a reset signal and inputted to the DFF 32a as data.

A synchronizing-start pulse "E", whose timing is equal to that of the start pulse "B" synchronized with the standard clock signals "C", is outputted from a Q-terminal of the DFF 32a.

The first counter 32b executes counting action when the start pulse "B" is valid, e.g., high, and count value is changed as shown "D". Upper bit of the first counter 32b is outputted from the synchronizing circuit 32 as signals "F". Namely, signals, which are generated by dividing the standard clock signals "C" by four, are outputted as clock signals "F" (250 MHz).

The synchronizing-start pulse "E" and the clock signals "F" are inputted to the pattern generating circuit 66. For example, as shown in FIG. 4, the pattern generating circuit 66 includes an address counter (second counter) 66a and a pattern memory 66b in which patterns of the servo data are stored.

The clock signals "F" are used by the second counter 66a as clock signals and the synchronizing-start pulse "E" (8 KHz) is used as a reset signal. Bit number of the second counter 66 is 250 MHz/8 KHz=31250, so the second counter 66a reuires 15 bit or more. Note that, capacity of the pattern memory 66b is equal to or more than that of the second counter 66a.

The second counter 66b executes counting action when the synchronizing-start pulse "F" is valid, e.g., high, and count value is changed as shown "G". Output of the second counter 66b is inputted to address of the pattern memory 66b, so that the servo data for each sector, which are synchronized with the synchronizing-start pulses "E" are outputted, then the servo data H for each sector are outputted and synchronized with the clock signals "F" on the basis of the prescribed address.

In the present embodiment, the address length of the second counter 66a and the pattern memory 66b indicate one sector, but they may indicate one track.

The synchronizing-start pulse "E" is invalidated at a mid part of the sector and the count value of the second counter 66a is reset and keeps zero, but the servo data are generally recorded at the beginning of each sector and spend very short time so it causes no problems. For example, if time length of one sector is about 100 micro second, time length of the servo data recorded position is very short: about 10 micro second from the beginning of the sector, so it is enough for the second counter 66a to keep counting until reaching a center part of the sector.

Note that, in FIG. 4, the standard clock generating circuit 28, the start pulse generating circuit 30 and the synchronizing circuit 32 are provided outside of the pattern generating circuit 66. But they may be provided in the pattern generating circuit 66.

Figure 1:
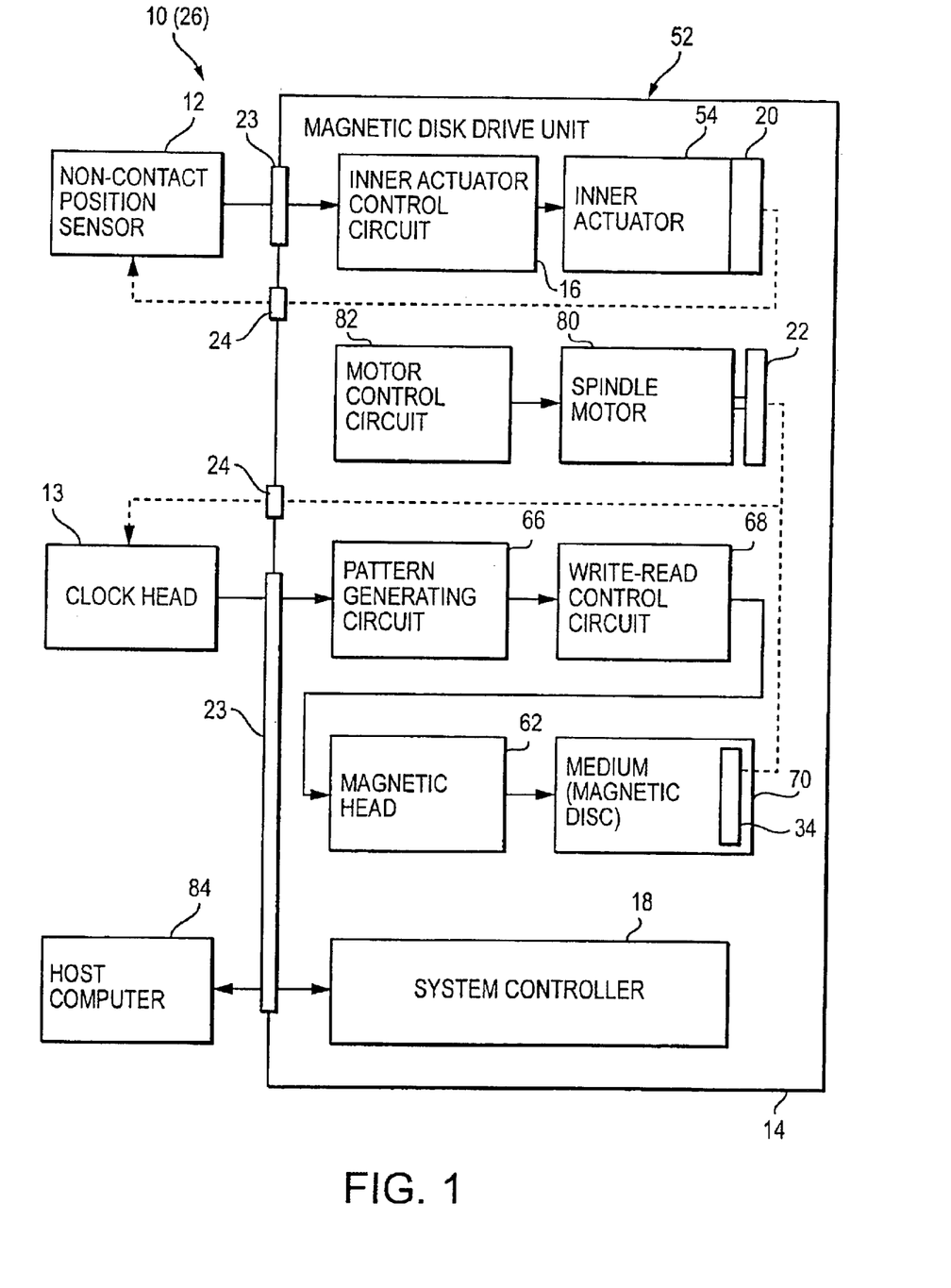
FIG. 1 is a block diagram of First Embodiment of the servo data writing device of the present invention.
Figure 2:
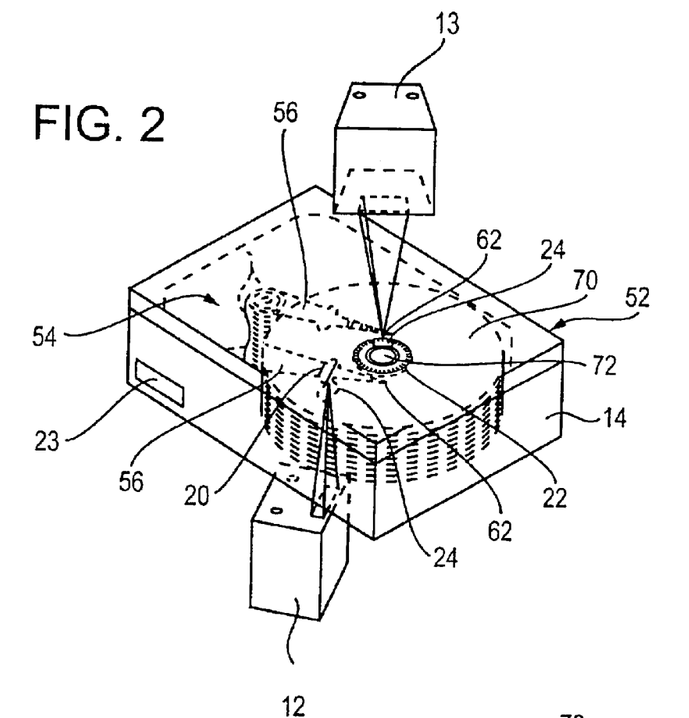
FIG. 2 is a perspective view showing a positional t relationship between two non-contact sensors of the servo data writing device shown in FIG. 1 and a magnetic disk drive unit.

In the case that the servo data writing device has the structure of the First Embodiment shown in FIG. 1 in which the clock head is the non-contact type, the encoding scale 22 for generating the reference clock signals is previously provided to the spindle 72 or the magnetic disk 70. Therefore, the duty ratio of the reference signals, which are generated from the clock head 13, is fixed.

However, in this case, number of the reference clock signals, which are generated while the magnetic disk 70 makes one rotation, is fixed. In the case of some types of the magnetic disks, the clock signals for generating the servo data cannot be made in spite of multiplying integral number, so that the reference clock signals cannot be used as the clock signals of the pattern generating circuit 66.

In the present embodiment, the reference clock signals outputted from the clock head 13 are not directly used as the clock signals of the pattern generating circuit 66, so the servo data writing device of the present embodiment can be applied to the First Embodiment shown in FIG. 1.

And, in the case of employing the non-contact type clock head 13, resolution of the encoding scale 22 is lower than that of the magnetic clock head. And, in many cases, the frequency of the the reference clock signals outputted from the clock head 13 is low. In the case of low frequency, for example, a PLL circuit is provided in a latter side of the clock head 13, the frequency of the reference clock signals is increased by multiplying integral number, then the multiplied signals are inputted to the start pulse generating circuit 30. The PLL circuit can absorb jitter of the signals outputted from the clock head 13.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A servo writing device, to which a magnetic disk drive unit, which includes: a magnetic disk attached to a spindle; and a magnetic head for writing data onto and reading data from the magnetic disk, is attached and which writes servo data in each sector of each track of the magnetic disk with the magnetic head wherein servo data recorded positions of the tracks are mutually corresponded, comprising:

a clock head for generating reference clock signals, which are changed on the basis of rotation of the spindle or the magnetic disk;

a standard clock generating circuit generating standard clock signals, whose frequency is higher than that of the reference clock signals and which is not synchronized with the reference clock signals;

a start pulse generating circuit receiving the reference clock signals as clock signals and generating a start pulse corresponding to the servo data recorded position;

a synchronizing circuit synchronizing the start pulse with the standard clock signals and generating a synchronizing-start pulse; and a pattern generating circuit receiving the standard clock signals as clock signals and generating the servo data synchronizing with the synchronizing-start pulse.

* * * * *